Nov. 20, 1962  J. C. MAY  3,065,019
CAMPING TRAILER
Filed July 28, 1959  2 Sheets-Sheet 1
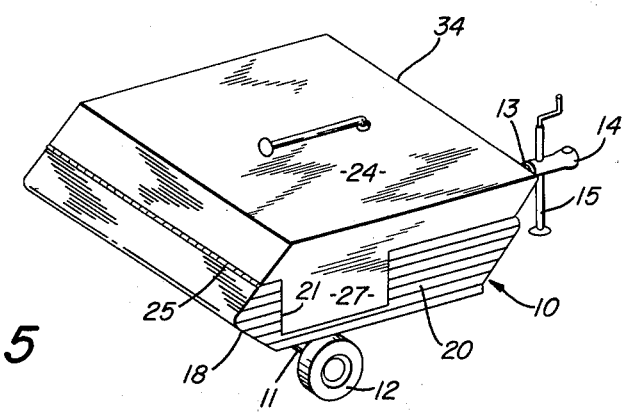
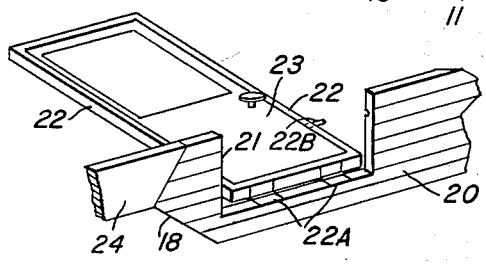
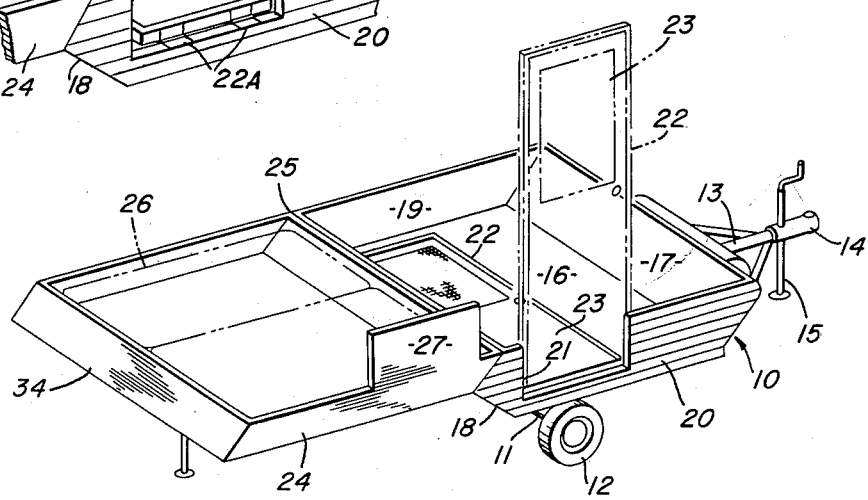
INVENTOR.
JOHN C. MAY
BY W. B. Harpman
ATTORNEY Nov. 20, 1962  J. C. MAY  3,065,019
CAMPING TRAILER
Filed July 28, 1959  2 Sheets-Sheet 2
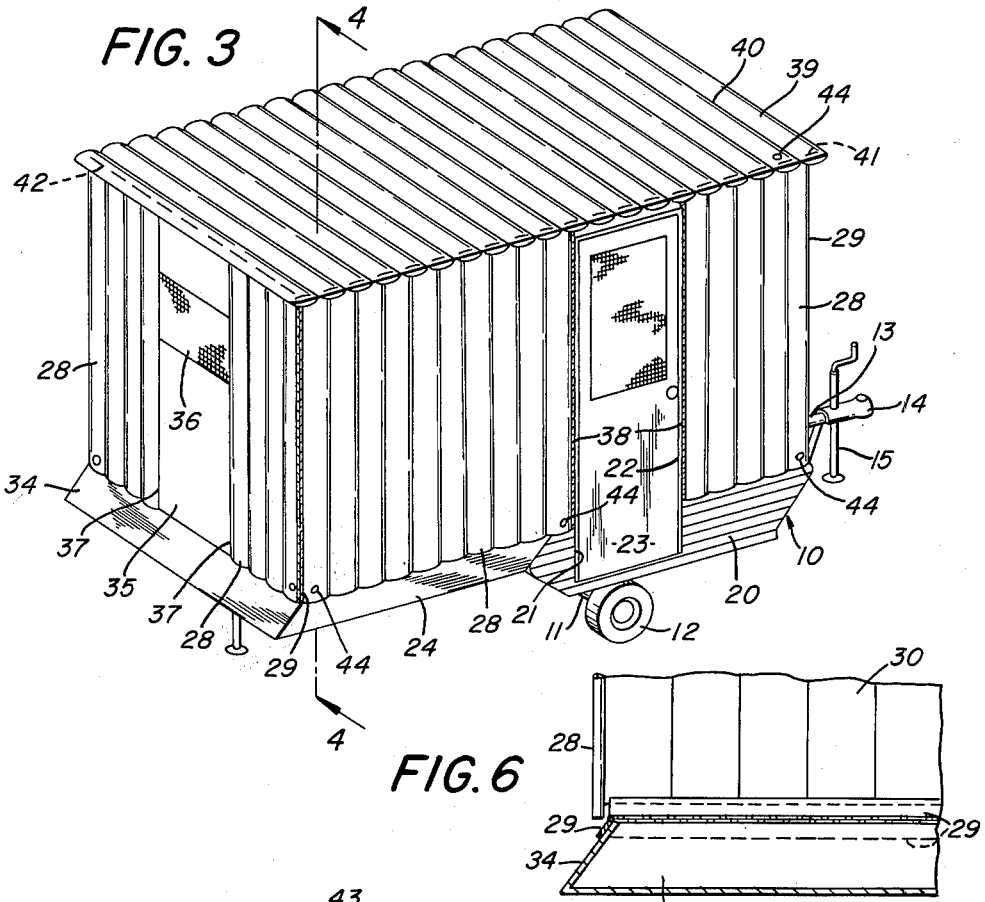
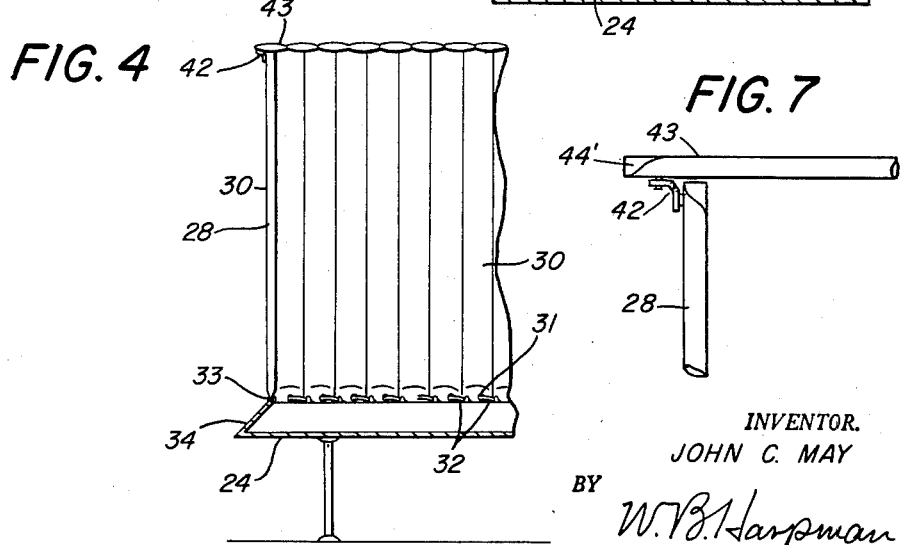
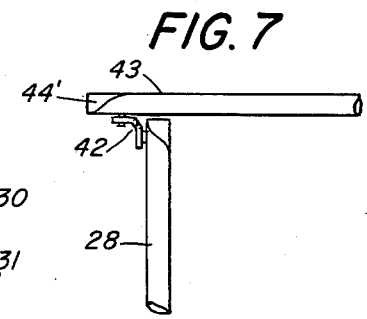
INVENTOR.
JOHN C. MAY
BY
W. B. Harpman
ATTORNEY United States Patent Office 3,065,019
Patented Nov. 20, 1962

3,065,019
CAMPING TRAILER
John C. May, 7600 E. New Highway 40,
Kansas City, Mo.
Filed July 28, 1959, Ser. No. 830,071
4 Claims. (Cl. 296—23)

This invention relates to a camping trailer and more particularly to a trailer incorporating an inflatable body structure.

The principal object of the invention is the provision of a trailer having a body and a hinged cover therefor and arranged so that when the hinged cover is opened an inflatable side wall and top structure may be installed thereon to form a weather-tight enclosure.

A further object of the invention is the provision of a camping trailer that folds into a relatively small trailer that can be easily towed by an automobile.

A still further object of the invention is the provision of a camping trailer in which the body and cover therefor are separable so that the body may be used as a utility trailer.

A still further object of the invention is the provision of a trailer having side walls and top formed of inflatable sections detachably secured to the trailer and to one another.

The camping trailer disclosed herein comprises an improvement in the art of trailers as heretofore used for utility and camping purposes. The trailer comprises a compact relatively small sized body unit having frame with a tongue for towing and ground engaging wheels and springs thereinunder. A cover is hinged to the body and adapted to be folded rearwardly to form an extension of the body. The area within the body and the cover being sufficient to enclose necessary camping equipment including beds and food supplies and cooking equipment and the inflatable members, which when inflated and secured to the body and cover portion of the trailer form vertical side walls and a horizontal roof portion.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of the camping trailer in closed position.

FIGURE 2 is a perspective view of the camping trailer in opened position, broken lines indicating the location of the door frame and door.

FIGURE 3 is a perspective view of the trailer with the side and top walls inflated.

FIGURE 4 is a vertical section on line 4—4 of FIGURE 3 showing the details of construction.

FIGURE 5 is an enlarged detail with parts broken away illustrating a portion of the trailer and the door frame shown in FIGURE 2.

FIGURE 6 is an enlarged detail with portions broken away illustrating the separable fastener joining the cover 24 of the trailer and the bottom portions of the side wall 30 as shown in the modification illustrated in FIGURE 4.

FIGURE 7 is an enlarged detail with parts broken away showing a separable fastener joining the upper ends of the inflatable panels 28 to the one end of the inflatable roof panel 43.

By referring to FIGURES 1 and 2 of the drawings it will be seen that the trailer comprises a body 10 mounted on a frame including an axle 11 having ground engaging wheels 12 and a tongue 13. A hitch 14 is positioned on the forward end of the tongue 13 and a movable extension 15 is positioned vertically therethrough. The body 10 has a floor 16, a forwardly inclined front wall 17 and a rearwardly inclined rear wall 18 with oppositely disposed side walls 19 and 20 therebetween, all of which extend above the floor 16. The side wall 20 has an opening 21 therein in which a door frame 22 having a door 23 therein is positioned when the trailer is opened. A cover 24 is hinged to the rear wall 18 and is movable upward and outwardly therefrom in a direction opposite to that of the tongue 13. The cover 24 is secured to the upper edge of the rear wall 18 of the trailer body 10 by a separable hinge 25 so that the cover 24 may be detached from the body 10 and the body 10 of the trailer used alone as a utility trailer. The cover 24 normally contains camping equipment such as bedding 26, secured therein, as best seen in FIGURE 2 of the drawings.

It will be observed that the door frame 22 and door 23 are positioned flat on the floor 16 and that the frame 22 is hinged as at 22A to the floor 16 transversely of the opening 21 in the side wall 20 of the trailer body 10. Thus when the cover 24 is unfastened from the position shown in FIGURE 1 and swung upwardly and backwardly to the position shown in FIGURE 2, pivoting on the axis of the hinge 25, the door frame 22 and door 23 may be swung upwardly from the floor 16 and locked in vertical position in the wall 20 by a bolt 22B as shown in broken lines in FIGURE 2. It will also be observed that when the cover 24 is in closed position, as shown in FIGURE 1, an upward extension 27 of a side wall of the cover 24 registers with and closes the opening 21 in the wall 20. It will thus be seen that a trailer has been disclosed which upon having the cover portion 24 opened will form an enlarged rectangular floor area with partial side walls and a door frame and door positioned in one of the side walls.

By referring now to FIGURES 3 and 4 of the drawings it will be seen that the camping trailer is completed by assembling a plurality of flexible hollow inflatable panels 28 to one another at their side edges and securing their bottom ends to the upper edges of the trailer body 10 and the cover 24. Each of the inflatable panels 28 comprises two sections of air-tight material, such as plastic sheeting, seamed together at their edges and having a plurality of seams running longitudinally thereof terminating short of the ends of the panels to provide communicating passageways 44' between adjacent inflatable areas of said panels. To facilitate assembly of the inflatable panels 28 the edges of each of the panels 28 are provided with portions of separable slide fasteners 29, as known in the art, which slide fasteners 29 may be continuously fastened together to join the several panels 28 into one continuous side wall. The bottom ends of the inflatable panels 28 are similarly attached by separable slide fasteners 29, to the upper edges of the walls of the body 10 and cover 24.

Alternately, they may be apertured at intervals and a cord positioned therethrough as illustrated in FIGURE 4 wherein panels 30 are provided with apertures 31 through which a cord 32 is positioned and the cord 32 engaged on a molding 33 secured to the upper edge of the cover 24.

By referring again to FIGURE 3 of the drawings it will be seen that windows are provided by including non-inflatable panels 35 in the side wall construction formed by the assembled inflatable panels 28 and which non-inflatable panels 35 may be provided with screened openings 36. The non-inflatable panels 35 are secured along their vertical longitudinal edges to the adjacent longitudinal edges of the inflatable panels 28 by separable slide fasteners 37 and a separable slide fastener 38 secures the edges of the door frame 22 to the adjacent edges of the inflatable panels 28. The top of the trailer body is formed of a large panel 39 of flexible hollow inflatable material having seams 40 running transversely thereof so that a bridge effect is accomplished. The inflatable top panel 39 is provided along its end portions and its sides with portions of separable slide fasteners 41, other portions of which are secured to the upper ends of the inflatable panels 28 and the non-inflatable panels 35 so that the entire assembly may be secured together.

In the modification of FIGURE 4 of the drawings, a separable fastener 42 is shown positioned between the inflatable panels 30 of the modified structure shown and an inflatable top panel 43 thereof and it will be observed that the top panel 43 overhangs the end panel 30. A similar arrangement is used in the construction shown in FIGURE 3. In FIGURE 3 air valves 44 provide means for inflating and deflating the various inflatable panels 28 and 39.

It will thus be seen that a camping trailer has been disclosed which includes several novel features and permits wide use of the trailer for various purposes. The trailer construction will thus be seen to meet the several objects of the invention and having thus described my invention, what I claim is:

1. In a camping trailer, a trailer body having a towing tongue and ground engaging wheels thereon and a cover therefor movable into open position adjacent said body, said body and cover having low side walls, one of said side walls of said body having an opening therein, a plurality of inflatable panels each formed of two sections of air tight material seamed together at their edges and having a plurality of spaced longitudinally extending parallel seams therein with communicating openings therethrough, portions of separable slide fasteners on the side edges and ends of said inflatable panels and on the side walls of said trailer body and cover, said portions of slide fasteners on said trailer and cover arranged to engage the slide fasteners on one of the ends of said inflatable panels, a secondary inflatable panel having portions of slide fasteners around the edges thereof for engagement with said slide fasteners on the other ends of said first mentioned inflatable panels and forming a roof for said trailer.

2. The camping trailer set forth in claim 1 and wherein a door frame and door are positioned in said trailer body in said opening and wherein said inflatable panels and said door frame have portions of engaging slide fasteners thereon.

3. The camping trailer set forth in claim 1 and wherein said cover has an extended wall section on one side for registry with said opening in said trailer body when said cover is closed on said trailer body.

4. In a camping trailer, means for forming collapsible side walls and a roof therefor, said means comprising a plurality of inflatable side wall panels having portions of separable slide fasteners on their edges and portions of secondary separable slide fasteners on their ends and at least one non-inflatable panel having separable slide fasteners on its edges and a window opening therein, and wherein said trailer has portions of said secondary separable slide fasteners thereon, said portions of separable slide fasteners acting to join said inflatable panels into a unitary side wall construction and said secondary separable slide fasteners acting to join said side walls to said trailer, and a secondary inflatable panel having separable slide fasteners around its edge portions adapted to be positioned on the upper ends of said first-mentioned inflatable panels to form a roof portion secured thereto by said separable slide fasteners, and wherein said non-inflatable panel is positioned in between two of said inflatable panels and secured thereto by said separable slide fasteners.

References Cited in the file of this patent

UNITED STATES PATENTS

| | | |
|---|---|---|
| 2,048,461 | Mosgoffian | July 21, 1931 |
| 2,296,358 | Marinsky et al. | Sept. 22, 1942 |
| 2,656,844 | Kreuzer | Oct. 27, 1953 |
| 2,754,836 | Darby | July 17, 1956 |
| 2,895,490 | Dimond | July 21, 1959 |

FOREIGN PATENTS

| | | |
|---|---|---|
| 498,162 | Great Britain | Jan. 4, 1939 |
| 711,019 | Great Britain | June 23, 1954 |
| 378,944 | Italy | Feb. 27, 1940 |